United States Patent [19]
Tinet

[11] 3,952,191
[45] Apr. 20, 1976

[54] CONTROLLED SYSTEM FOR FOCUSSING A READ-OUT LIGHT BEAM

[75] Inventor: Claude Tinet, Paris, France
[73] Assignee: Thomson-Brandt, Paris, France
[22] Filed: Nov. 14, 1974
[21] Appl. No.: 523,834

[30] Foreign Application Priority Data
Nov. 13, 1973 France .............................. 73.40882

[52] U.S. Cl. .......................... 250/201; 179/100.3 V
[51] Int. Cl.² ......................................... G01J 1/20
[58] Field of Search ............... 250/201, 204, 237 G; 179/100.3 G, 100.3 V, 100.3 B; 340/173 LM, 173 LS, 173 LT

[56] References Cited
UNITED STATES PATENTS

| | | | |
|---|---|---|---|
| 3,716,845 | 2/1973 | Chaffin | 340/173 LM |
| 3,736,057 | 5/1973 | Harvey | 250/201 |
| 3,825,323 | 7/1974 | Landwer | 179/100.3 V |
| 3,833,769 | 9/1974 | Compaan et al. | 250/201 |
| 3,848,095 | 12/1972 | Wohlmut et al. | 179/100.3 V |
| 3,854,015 | 12/1974 | Janssen | 179/100.3 G |
| 3,876,827 | 4/1975 | Janssen | 179/100.3 V |

Primary Examiner—Archie R. Borchelt
Assistant Examiner—D. C. Nelms
Attorney, Agent, or Firm—Cushman, Darby & Cushman

[57] ABSTRACT

A controlled system for focussing a read-out light beam onto a moving track carrying information, comprising: a focussing objective lens for forming a periodic motion along its optical axis, under the action of a pilot device; a comparator comparing the pilot signal with the envelope of an electrical read-out signal, the comparator thus producing a focussing error signal, and means for applying said signal to the focussing objective lens for correction purposes.

8 Claims, 4 Drawing Figures

CONTROLLED SYSTEM FOR FOCUSSING A READ-OUT LIGHT BEAM

The present invention relates to the optical read-out of a moving track carried by a disc or tape, on which information is recorded. The invention relates more particularly to a controlled system for focussing the read-out light beam on the track.

The optical read-out of high-density recorded information poses a difficult technical problem of accuracy, and various systems have thus far been put forward which are intended to ensure the proper relative positioning of track and read-out head, in relation to the track axis, in a plane perpendicular to the read-out beam.

In addition, in certain applications, the read-out beam furthermore has to be focussed extremely accurately on the track carrying the information, the order of magnitude of the requisite accuracy being substantially the same as before, that is to say one micron.

Various systems are in existence for this purpose, which utilise auxiliary distance-measuring devices such as a capacitive device one of whose plates is connected to the mobile focussing lens and the other is constituted by a metallised finish on the track substrate, the variation in the capacitance of the capacitor thus formed, constituting the focussing error signal. Another system consists in using an auxiliary light beam, offset in relation to the optical axis of the focussing lens; in this system a pair of photodetectors and a differential amplifier furnish the error signal. These different devices are all subject to systematic zeroing errors or errors in the positioning of the receptors (for example the aforementioned photodetectors).

The object of the present invention is a controlled system for focussing a read-out light beam upon a moving track carrying information using the information-bearing signal itself for the detection of the focussing error.

According to the invention, there is provided a controlled system for focussing a read-out light beam on a moving substrate carrying data, comprising:

means for producing a periodic electrical pilot signal;

a moving objective lens causing said beam to converge on said substrate, said beam being then modulated by said data, and said lens executing a motion parallel to its optical axis under the effect of said pilot signal;

electro-optical means for transforming said modulated light beam into an electrical read-out signal, representing said data;

means for comparing said pilot signal with said read-out signal, and producing a focussing error signal;

means for applying said focussing error signal to said objective lens, thus effecting said focussing.

For a better understanding of the invention and to show how the same may be carried into effect, reference will be made to the following description and the attached drawings where:

In these various figures, similar elements are designated by similar reference numbers.

Figure 1:
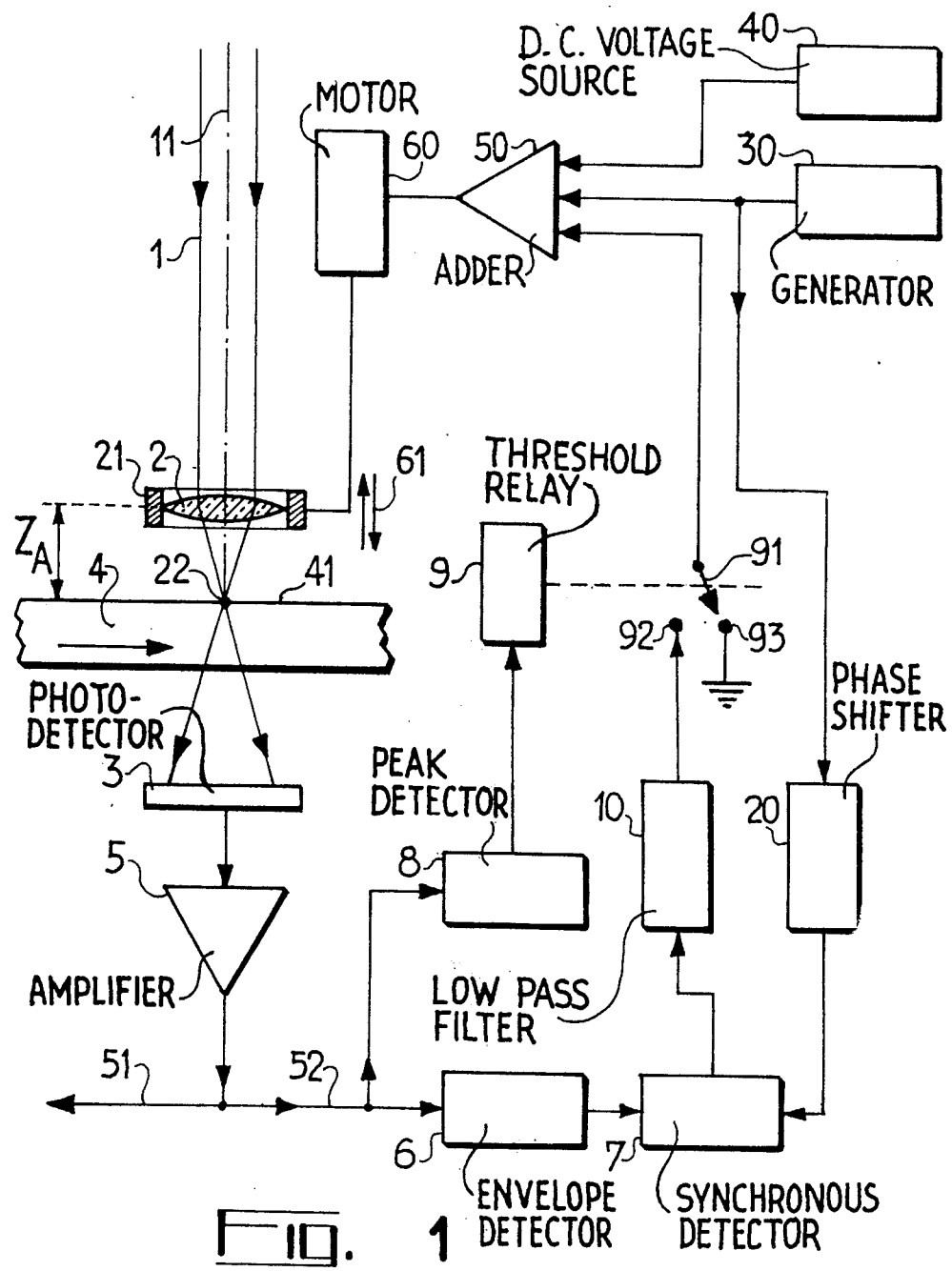
FIG. 1 is a schematic embodiment of the system in accordance with the invention.

In FIG. 1, there can be seen: a substrate or data carrier 4, moving for example in the direction indicated by an arrow and carrying upon its face 41 recorded information; a first assembly of elements for the optical read-out of this information, and a second assembly of elements for focussing the read-out beam.

The first assembly is constituted by:

an information read-out parallel light beam 1, which has an axis 11; an objective lens 2 carried by a mounting 21, with an optical axis 11, said lens causing the beam 1 to converge geometrically at a point 22 located, when focussing is correct, on the face 41;

a photodetector 3 converting the light beam modulated by the information, into an electrical signal known as the read-out signal V;

an amplifier 5 of the signal V.

The amplitude of the signal V is dependent upon the focussing error. It can for example be a periodic signal, the phase or frequency of which is representative of the coded information recorded on the substrate 4. At the output of the amplifier 5, the signal is directed on the one hand to a channel 51 for decoding and processing of the information, aspects which will be disregarded here, and on the other hand to a channel 52 taking it to the second assembly of elements referred to earlier.

Said second assembly of elements comprises:

an envelope detector 6 receiving the signal V through the channel 52;

a synchronous detector 7 receiving at one of its two inputs the signal developed in the detector 6;

a low-pass filter 10 connected to the output of the detector 7;

a switch 91 controlled by a threshold relay 9; one of the positions (92) of the switch corresponds to the output of the filter 10 and the other (93) is earthed;

a three input adder 50, the first of whose inputs is connected to the switch 91;

a motor 60 imparting a translatory motion to the mounting 21 of the objective lens 2, parallel to its optical axis 11 (arrows 61) under the control of the signal coming from the adder 50;

a generator 30 producing a periodic pilot signal P, preferably a sinusoidal signal of periodicity T, connected to the second input of the adder 50;

a variable d.c. voltage source 40, adjustable manually for example, connected to the third input of the adder 50;

a phase-shift device 20 producing a phase-shift in the pilot signal generated by the block 30, and supplying the second input of the synchronous detector 7;

a peak detector 8 supplied with the signal V via the channel 52, the detector 8 thus furnishing the level of the signal V to the threshold relay 9.

The operation of this second assembly of elements is designed to give the objective lens 2 an alternating motion of periodicity T parallel to its optical axis, under the control of the pilot signal P. The effect of this is to vary the amplitude of the signal V in a periodic way and to compare the signal V thus modulated with the signal P in order to produce a focussing error signal. This comparison is carried out in three phases: first detection of the envelope of the signal V (detector 6), then synchronous detection (detector 7) between the pilot signal P (coming from the generator 30 and the phase-shift device 20) and the envelope of the signal V, and, finally, elimination of the highest frequency components (filter 10), so that only the focussing error signal is left, this being translated into terms of a correction of the position of the objective lens 2 through the medium of the adder 50 and the motor 60.

Figure 2:
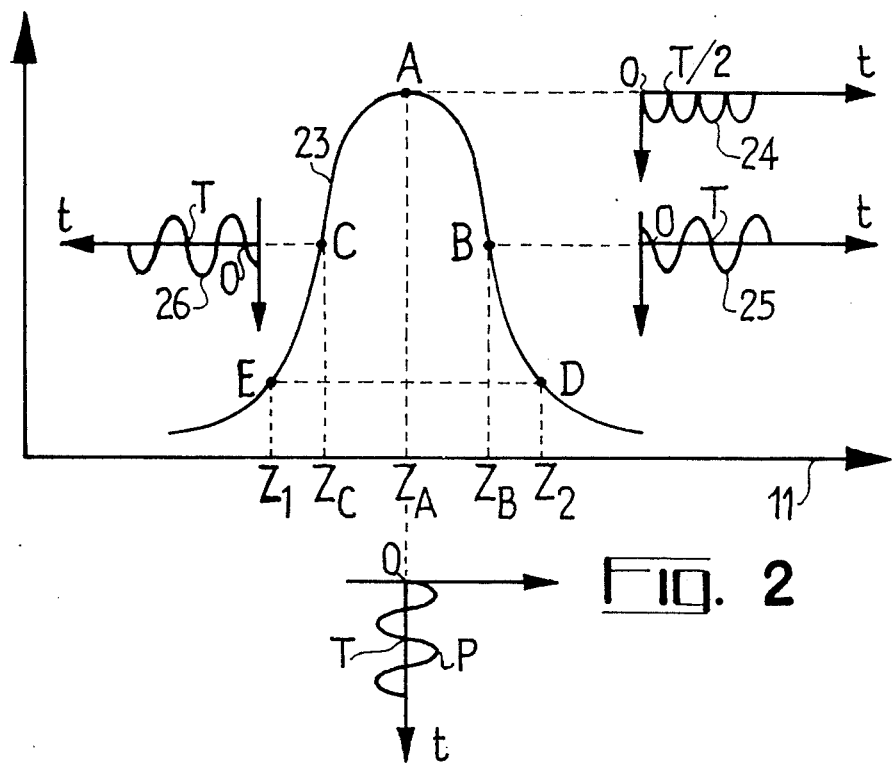
FIG. 2 illustrates explanatory diagrams.

In FIG. 2, five diagrams are provided which illustrate, in one embodiment, the shape of the various electrical signals hereinbefore referred to.

The first diagram (graph 23) represents the envelope of the signal V as furnished by the detector 6, the abscissa axis being the optical axis 11. The graph 23 exhibits a peak (A) at an abscissa $Z_A$ corresponding to correct focussing, i.e., point 22 arranged on the face 41 and objective lens 2 at a distance $Z_A$ from the face 41 on FIG. 1.

The second diagram (graph P) illustrates as a function of time ($t$), the sinusoidal pilot signal P of periodicity T.

The third diagram (graph 24), as those skilled in the art will appreciate, shows how the signal V contains a periodic function of periodicity $T/2$, when focussing is correct (point A).

The fourth diagram (graph 25), shows how the signal V contains a periodic function of periodicity T equal to that of the signal P, but whose phase is not necessarily equal to that of the signal P, if focussing is incorrect, i.e., the objective lens 2 then is at the abscissa $Z_B$, the amplitude of the signal V corresponding to the point B.

The fifth diagram (graph 26), shows how the signal V contains a periodic function of periodicity T when focussing is incorrect, i.e., the objective lens 2 then is at the abscissa point $Z_C$, the amplitude of the signal V corresponding to the point C; this signal is out of phase by $\pi$ in relation to the signal shown on graph 25.

The points D and E, of abscissa values $Z_2$ and $Z_1$ respectively, define an operating zone whose function will be specified later on.

The synchronous detector 7 is a device, also known, with two inputs $E_1$ and $E_2$, the input $E_1$ receiving a periodic signal of periodicity T, and with an output such that:

the output signal contains no direct components when the input $E_2$ is supplied with a signal of half periodicity ($T/2$);

the output signal contains a direct component when the input $E_2$ receives a signal of the same periodicity (T), the output signal being of positive or negative sign depending upon whether the phase-shift between $E_1$ and $E_2$ is zero or equal to $\pi$.

In practice, this detector 7 can be designed as a signal multiplier.

In the device shown in FIG. 1, the low-pass filter 10 has been provided in order to produce a focussing error signal which can be employed directly to correct the position of the objective lens 2, through the medium of the adder 50 and the motor 60. The cut-off frequency of the filter 10 should theoretically be lower than the frequency of the signal P; in practice, a value which is around five times smaller is used.

The system shown in FIG. 1 furthermore comprises a phase-shift device 20 whose function is to compensate for the phase-shifts introduced in particular by the response time of the motor 60 to the electrical command coming from the adder 50.

It should be pointed out that the frequency of the pilot signal P and its amplitude, should be chosen in such a fashion that they do not affect the characteristics of the recorded information which may in fact be in coded form.

The elements 8, 9, 91 and 40 provided in the system are employed when the system is in the acquisition phase of its operation. This corresponds to the case where, for example following the introducion of a new data carrier 4, the focussing point 22 is so far away from the face 41 that the mean working point is outside the operating zone defined in FIG. 2, between the points D and E of abscissa values $Z_1$ and $Z_2$ respectively.

In this case, the strength of the signal V will be very weak and the device 8, which is a conventional peak detector, will produce a direct signal filtered so that it will not contain any appreciable amplitude modulation component at the frequency of the signal P, and so that the threshold relay 9 will hold the switch 91 in position 93, where it is earthed. It is then necessary to adjust the d.c. voltage source 40 in order to correct the position of the objective lens 2, this until the amplitude of the signal V is sufficiently high for the threshold relay 9 to trip the switch 91 into its steady state operating position 92, namely the position in which it connects the filter 10 to the adder 50.

It is possible to arrange in this system an associated display device which indicates the instant of switching, this being the instant at which control is effective, so that the manual adjustment performed with the help of the source 40 can be ended.

In the embodiment described in FIG. 1, the read-out of the information is effected by transmission and the information is recorded upon the top face (41) of the substrate 4. The system in accordance with the invention is applicable, of course, equally to a technique of read-out by reflection, and indeed to any method of information or data recording.

Figure 3:
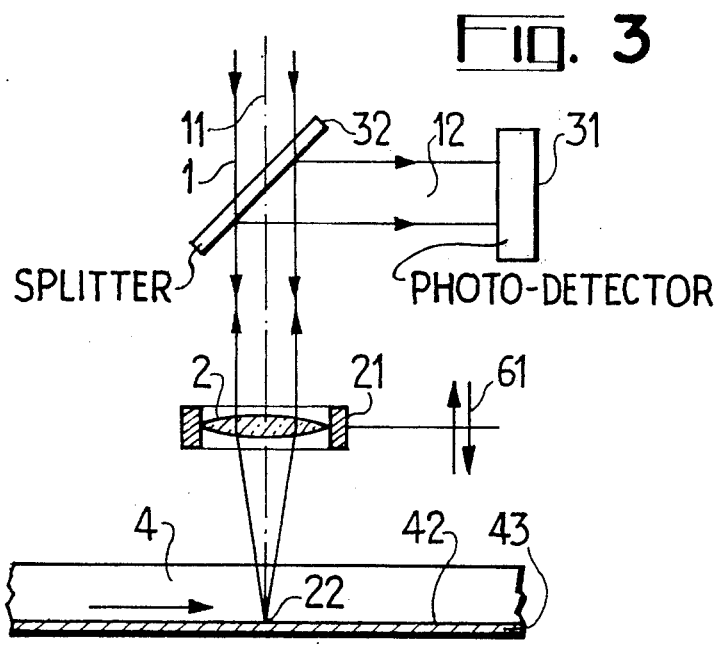
FIGS. 3 and 4 illustrate variant embodiments of the system in accordance with the invention.

In FIG. 3, by way of example, the case has been illustrated in which the information is recorded upon the opposite face of the substrate 4, along a track 42, and in which read-out is effected by reflection of the light. To this end the substrate 4 comprises a metal layer 43, after the track 42, whose function is to reflect the read-out light beam 1, and a light splitter 32, inclined for example at 45° in relation to the optical axis 11, the function of which is to deflect the reflected beam on to a photodetector 31. The remainder of the system is identical to that of FIG. 1 and has consequently been omitted from the illustration.

Figure 4:
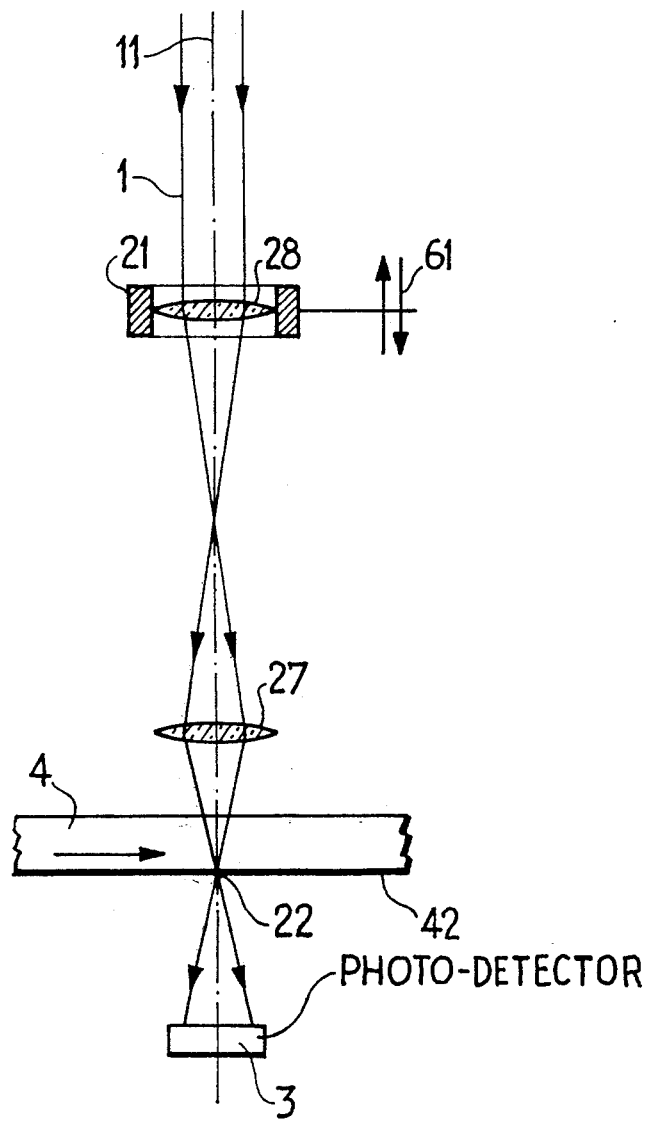

FIG. 4 illustrates a variant embodiment of the system described in FIG. 1, in which the moving objective lens 2 is replaced by two objective lenses 28 and 27, only the first of which is carried by the mounting 21 and is movable along the optical axis 11 (arrows 61). A device of this kind operates in the same fashion as the embodiment shown in FIG. 1 but may take preference over the latter for reasons of facility of assembly or for reasons associated with the dynamic range, the objective lens 28 being in effect displaceable over a longer distance than the objective lens 2 of FIG. 1.

In this embodiment, read-out is effected for example, by transmission, the data being carried by the bottom face 42 of the substrate 4. The objective lenses 28 and 27 have a common focal plane so that the light beam 11 converges geometrically at a point 22 whose position on the axis 11 depends upon that of the objective lens 28.

Of course, the invention is not limited to the embodiments described and shown which were given solely by way of example, but the controlled focussing system in accordance with the invention is applicable to any optical read-out of information carried by a moving track. However, it is more particularly suitable for the read-out of high density information as for example television signals, and can readily be utilized at the same time as a device for performing transverse correction of the position of the pick-up or read-out device in relation to the track axis, in a plane parallel to the physical substrate or carrier of the track.

What I claim is:

1. A system for controlling the focussing of a convergent beam of radiant energy directed toward a recorded face of a substrate carrying data in the form of an angularly modulated carrier wave, said carrier wave being transcribed along an optically readable track lying within said recorded face; said system comprising: generator means for producing a periodic electrical pilot signal having a frequency substantially smaller than the lowest frequency of said angularly modulated carrier wave; an objective lens causing said convergent beam of radiant energy to illuminate said optically readable track at its convergence point electromechanical means arranged for displacing said convergence point in response to said periodic electrical electrical pilot signal and along the direction of incidence of said convergent beam; photodetector means arranged for collecting a portion of the radiant energy emerging from the illuminated portion of said optically readable track; sensing means connected to the respective outputs of said generator means and of said photodetector means for producing a focussing error signal; and feed back means for applying said focussing error signal to the control input of said electromechanical means, thus bringing said convergence point in coincidence with said recorded face.

2. A system as claimed in claim 1, wherein said pilot signal is sinusoidal.

3. A system as claimed in claim 1, wherein said sensing means comprises a synchronous detector having a first input for receiving said pilot signal, and signal envelope detector means connected to the output of said photodetector means for delivering an envelope waveform; said envelope waveform being fed to a further input of said synchronous detector; said synchronous detector delivering said focussing error signal in the form of a DC component; said DC component being positive or negative depending upon the sense of the focussing correction which is to be effected.

4. A system as claimed in claim 1, further comprising threshold switching means and a peak detector connected to the output of said photodetector means for controlling said threshold switching means; said threshold switching means being arranged for disconnecting said feed back means each time the peak value of the voltage delivered by said photodetector means is lower than a predetermined threshold.

5. A system as claimed in claim 4, further comprising a variable d.c. voltage source connected to said feed back means.

6. A system as claimed in claim 1, wherein the read out of said track is effected by transmission of said radiant energy through said substrate.

7. A system as claimed in claim 1, wherein the read out of said track is effected by reflection of said radiant energy from said recorded face.

8. A system as claimed in claim 1, wherein said objective lens comprises at least two lens elements; one of said lens elements being fixed, and the other of said lens elements being displaced along said direction of incidence by said electromechanical means.

* * * * *